Sept. 1, 1942.    H. P. DEYARMOND    2,294,836
SAW RETOOTHER
Filed Dec. 13, 1941

INVENTOR.
Herbert P. Deyarmond
BY
Victor J. Evans & Co.
ATTORNEYS

Patented Sept. 1, 1942

2,294,836

UNITED STATES PATENT OFFICE 2,294,836

SAW RETOOTHER

Herbert P. Deyarmond, Los Angeles, Calif.

Application December 13, 1941, Serial No. 422,925

3 Claims. (Cl. 76—37)

This invention relates to a saw re-toother and has for an object to provide a device of this character in which a thin abrasive wheel, supported at the sides by disks to prevent breaking of the wheel, cuts deep rounded valleys between the teeth of the saw, so that a file need only be used to sharpen the points of the teeth and thus will file more saw teeth per file than ordinarily, the deep rounded valleys between the teeth preventing the accumulation of sawdust between the teeth, usually occurring in the V-shaped cuts made between the teeth by ordinary taper files, so that the saw will cut much faster than conventional saws.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specificaton:

Figure 1:
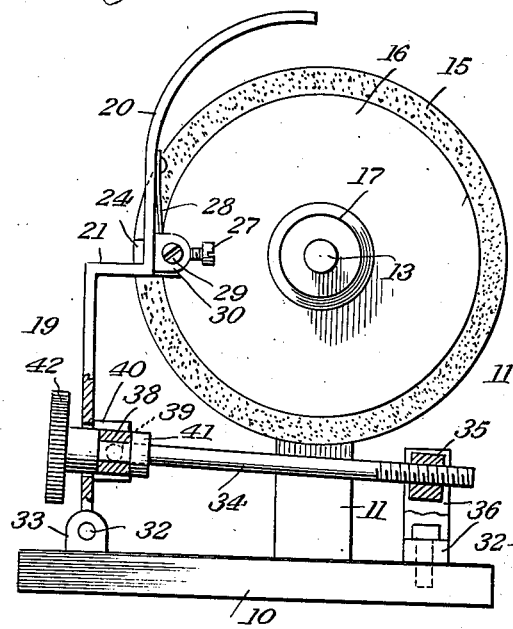
Figure 1 is a side elevation of a saw re-toother, with parts in section, constructed in accordance with the invention.

Referring now to the drawing in which like characters of reference designate similar parts in the various views, 10 designates a base plate. A standard 11 is secured to the base plate and is provided with bearings 12 to rotatably receive an arbor 13. The bearings are spaced apart and a pulley 14 is fixed to the arbor between the bearings and may be connected to any suitable source of power for rotating the arbor.

Figure 3:
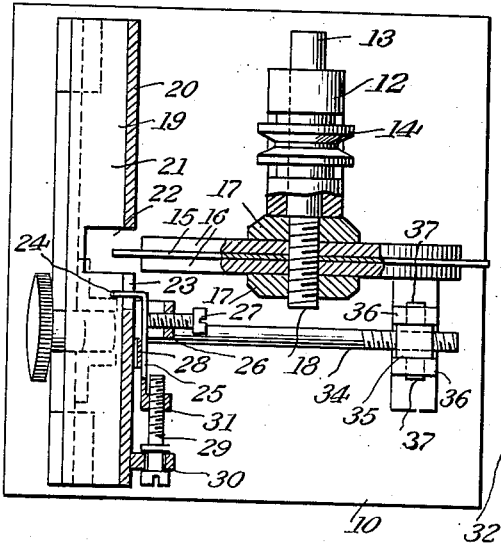
Figure 3 is a top plan, partly in section, of the saw re-toother shown in Figure 1.

A thin emery wheel 15, is fixed to the arbor between two disks 16 which may be formed of "Masonite," plywood, or other suitable material. A pair of clamp washers 17 is disposed on the arbor outside of the disks and for rigidly securing the disks and emery wheel together as a unit the end of the arbor is threaded as shown at 18 in Figure 3 to threadedly engage the clamp washers.

When the emery wheel 15 wears away the disks 16 may be removed and disks of smaller diameter substituted therefor.

Figure 2:
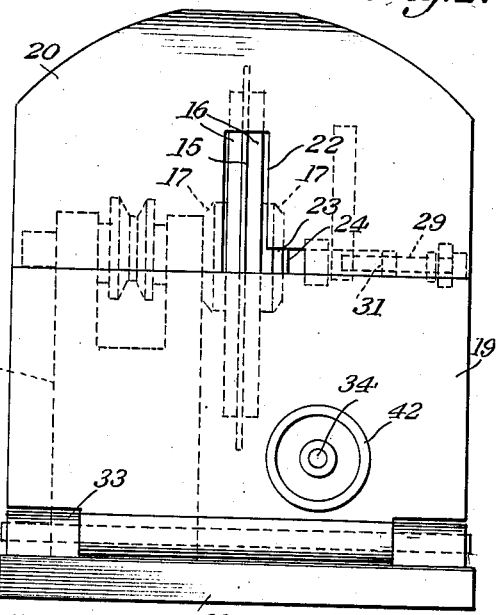
Figure 2 is a front elevation of the saw re-toother shown in Figure 1.

A guard 19, formed preferably of sheet metal or other suitable material, is provided with an offset arcuate upper portion 20 which overlies the emery wheel. That part 21 of the guard forming the offset, constitutes a rest for the saw to be re-toothed. The curved upper portion 20 and saw rest 21, of the guard are provided with a slot 22, see Figures 2 and 3, through which the emery wheel 15 extends.

One of the vertical walls of the slot is provided with a notch 23, through which a gage tooth 24 extends. The gage tooth is formed on one end of a gage bar 25 which is mounted on the rear side of the guard to permit the tooth to be adjusted forwardly, or rearwardly, or laterally. For this purpose the gage bar passes through a bracket 26 which is fixed to the rear side of the guard close to the notch 23 through which the tooth of the gage extends, and the bracket is provided with a screw 27 which bears against the gage and coacts with a leaf spring 28, also secured to the rear side of the guard, to effect the forward or rearward adjustment of the gage tooth 24. A screw 29 is swivelly mounted on a bracket 30 fixed to the rear side of the guard, close to one of the vertical edges of the guard, and is threadedly engaged with an angular end 31 formed on the gage, this screw providing means for securing the lateral adjustment of the tooth.

Figure 4:
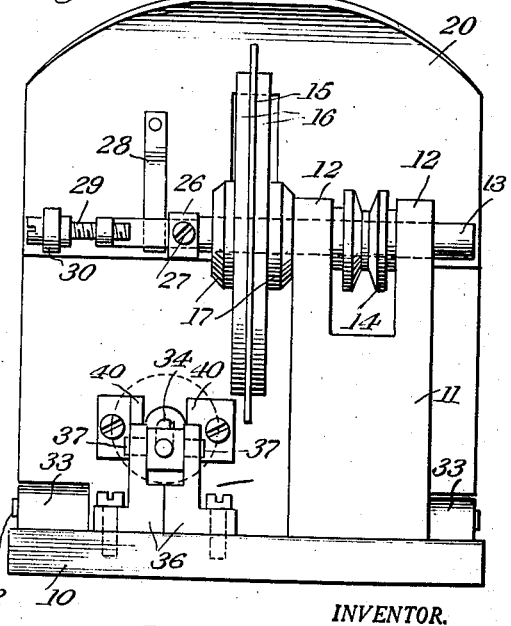
Figure 4 is a rear elevation of the saw re-toother.

The guard 19 is provided at the bottom with hinge pintles 32 which are rotatably mounted at the ends in bearing blocks 33 disposed on the base plate 10. For adjusting the guard forwardly or rearwardly a shaft 34 is mounted at the rear end in a nut 35 which is pivotally mounted between bearing brackets 36 through the medium of gudgeons 37 carried by the nut engaged through bearing openings in the brackets, see Figure 4. The opposite end of the shaft is swivelly mounted in a bearing 38 which is provided with gudgeons 39 which are engaged in bearing brackets 40 carried by the guard. A stop collar 41 is disposed on the shaft at the free ends of the brackets 40 and the shaft is disposed to project through the guard 19 and in front of the guard is equipped with a hand wheel 42 through the medium of which the shaft 34 may be rotated to move the shaft endwise through the adjusting nut 35 and carry the guard 19 forwardly or rearwardly in accordance with the direction of rotation of the shaft 34.

From the above description it is thought that the construction and operation of the invention will be fully understood without further explanation.

What is claimed is:

1. A saw re-toother comprising, a base plate, a driven arbor rotatably mounted on the base plate, a thin emery wheel secured to the arbor, reinforcing disks on each side of the emery wheel removably secured to the arbor, a guard hinged on the base plate having an offset portion adapted to support a saw and curved over the emery wheel, a gage member mounted on the guard for forward and backward and lateral adjustment having a tooth projecting through the guard for engaging a saw tooth, and means for rocking the guard on the hinge thereof toward and away from the emery wheel.

2. The structure as of claim 1 and in which the gage member adjustment is effected through the medium of a bracket on the guard straddling the gage member, a set screw on the bracket, a leaf spring on the guard coacting with the set screw in effecting forward and backward adjustment of the gage member, and an adjusting screw on the guard connected to the gage member and rotatable to effect lateral adjustment of the gage member.

3. The structure as of claim 1 and in which the means for rocking the guard on the hinge comprises a rod swiveled on the guard having a threaded end, a pivoted nut carried by the base plate and engaging the threaded end of the rod, and a hand wheel on the rod exposed exteriorly of the guard for rotating the rod to advance the rod endwise through the nut.

HERBERT P. DEYARMOND.